United States Patent [19]

Maier et al.

[11] Patent Number: 5,197,344
[45] Date of Patent: Mar. 30, 1993

[54] SHIFTING ARRANGEMENT FOR AN AUTOMATIC TRANSMISSION

[75] Inventors: Ulrich Maier, Freiberg/N.; Robert Mueller, Moensheim; Heinz Stehle, Weissach, all of Fed. Rep. of Germany

[73] Assignee: Dr. Ing. h.c.F. Porsche Aktiengesellschaft, Fed. Rep. of Germany

[21] Appl. No.: 648,289

[22] Filed: Feb. 1, 1991

[30] Foreign Application Priority Data

Feb. 22, 1990 [DE] Fed. Rep. of Germany ....... 4005588

[51] Int. Cl.⁵ ............................................. B60K 20/00
[52] U.S. Cl. .................................. 74/335; 74/473 R; 74/483 PB; 200/61.88
[58] Field of Search ............... 74/335, 473 R, 473 PB; 200/61.88

[56] References Cited

U.S. PATENT DOCUMENTS

| 4,425,620 | 1/1984 | Batcheller et al. ................ 74/866 |
| 4,570,765 | 2/1986 | Makita ................................ 192/356 |
| 4,610,178 | 9/1986 | Kameshita .......................... 74/335 |
| 4,610,179 | 9/1986 | Parker ................................ 74/335 |
| 4,660,430 | 4/1987 | Bortfeld et al. ............. 200/61.88 X |
| 4,884,057 | 11/1989 | Leorat ....................... 74/483 PB X |
| 4,987,792 | 1/1991 | Mueller et al. ............. 74/473 R X |
| 5,009,128 | 4/1991 | Seidel et al. ................ 74/473 R X |

FOREIGN PATENT DOCUMENTS

| 206297 | 11/1959 | Austria . |
| 0107761 | 5/1984 | European Pat. Off. . |
| 0353310 | 8/1989 | European Pat. Off. . |
| 0331797 | 9/1989 | European Pat. Off. . |
| 1962387 | 6/1967 | Fed. Rep. of Germany . |
| 1964524 | 7/1970 | Fed. Rep. of Germany . |
| 3237509 | 4/1984 | Fed. Rep. of Germany . |
| 3434205 | 3/1986 | Fed. Rep. of Germany . |
| 3717675 | 12/1988 | Fed. Rep. of Germany . |
| 3807881 | 9/1989 | Fed. Rep. of Germany . |
| 2636396 | 3/1990 | France . |
| 9004225 | 4/1990 | PCT Int'l Appl. . |
| 2228980 | 9/1990 | United Kingdom . |

Primary Examiner—Leslie A. Braun
Assistant Examiner—Ryan W. Massey
Attorney, Agent, or Firm—Evenson, Wands, Edwards, Lenahan, & McKeown

[57] ABSTRACT

A shifting arrangement for an automatic transmission has a selector lever guided in a shifting channel by which various transmission gears can be preselected. The forward gears can be shifted by hand by a manual gear selecting device. The gear selecting device is arranged on the selector lever or is constructed, for example, as a steering column switch. An electronic control unit controls the automatic as well as the manual gear selection.

14 Claims, 3 Drawing Sheets

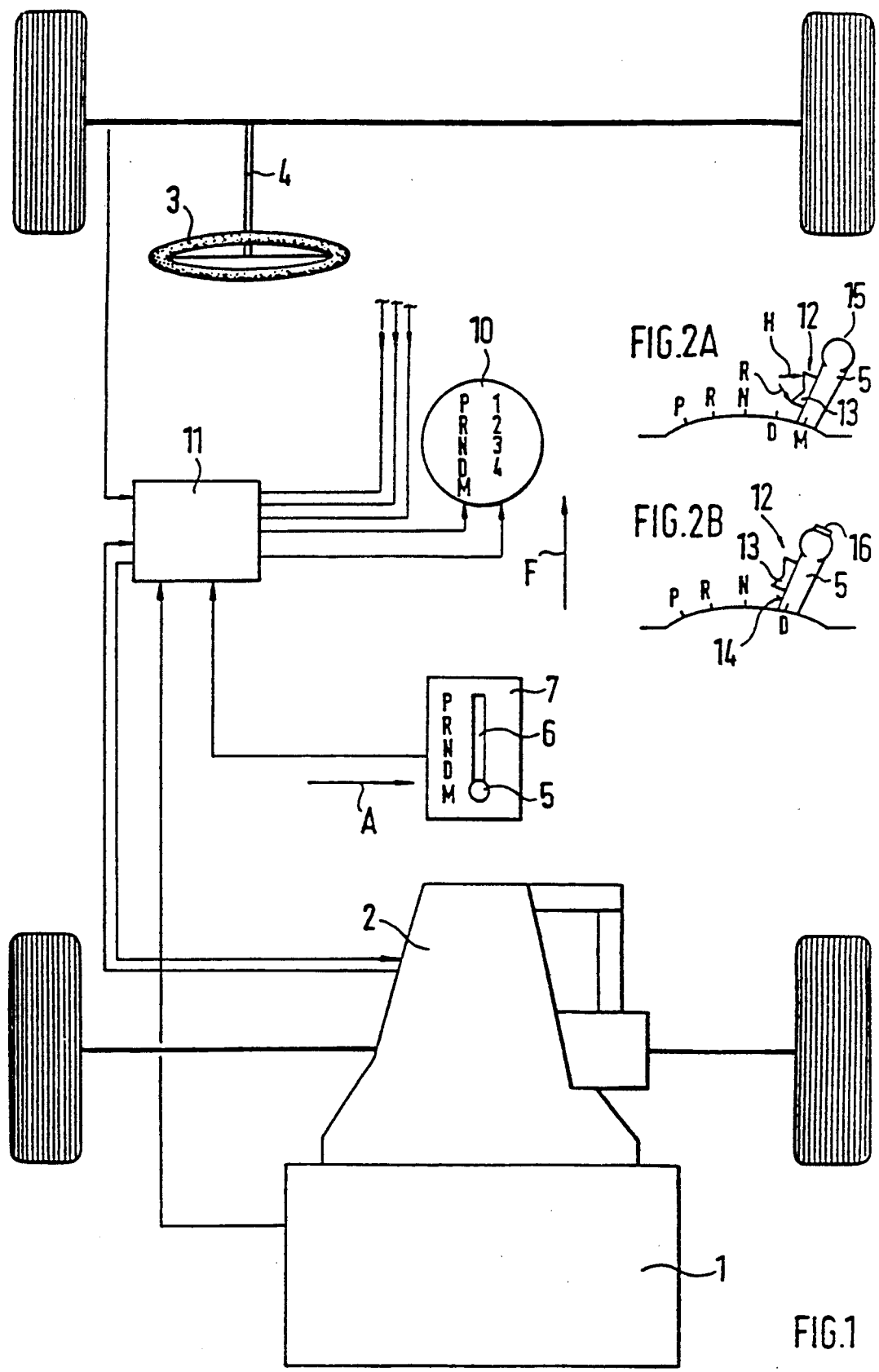

SHIFTING ARRANGEMENT FOR AN AUTOMATIC TRANSMISSION

BACKGROUND OF THE INVENTION

The present invention relates a shifting arrangement for an automatic transmission of a motor vehicle controlled by an electronic control unit, having a selector lever. The movement of the selector lever in a shifting channel causes coherent transmission gears to be preselected.

From the German Patent Document DE 38 07 881, a shifting arrangement is known for a power-shiftable transmission for a selectively automatic or manual shifting in a motor vehicle. In this case, the shifting arrangement comprises a selector lever guided in an H-shaped gate. One of the two shifting channels arranged in the longitudinal direction of the motor vehicle has the selector lever positions P, R, N, D, 3, 2, 1 which are customary for an automatic transmission, while, in the shifting channel that is in parallel to it, by movement the selector lever, an upward shifting by one gear can take place in the driving direction, and a downward shifting by one gear can take place against the driving direction.

It is an object of the present invention to improve a shifting arrangement of the above-described type so that the transmission can be shifted more easily and in a manner that increases the driving safety.

These and other objects are achieved in the present invention which provides a shifting arrangement for an automatic transmission of a motor vehicle controlled by an electronic control unit, comprising a shifting channel, a selector lever and a manual gear selecting device. The selector lever is in the shifting channel and is movable in the shifting channel to preselect different transmission gears. The selector lever is movement in the shifting channel into at least one of two positions in which a manual gear selecting device can trigger shifting commands. The manual gear selecting device is coupled to the electronic control unit which triggers shifting commands for shifting forward gears of the transmission.

This shifting arrangement permits the selective automatic or manual shifting of a power-shiftable transmission with a selector lever which is guided in only one shifting channel. The forward gears, which in the earlier-described German Patent Document DE 38 07 881 are shifted in a second shifting channel by movement of the selector lever, are instead shifted by a manual gear selecting device according to the present invention.

According to an embodiment of the present invention, this gear selecting device is formed by a rocker switch arranged on the selector lever which transmits shifting commands to an electronic control unit only if the selector lever, in a shifting channel enlarged by the M-position (=Manual), was brought into this M-position. As a basis for the upshifting or downshifting by one gear in the M-position, the gear which is present and automatically selected when the selector lever is moved out of the D-position (=Drive), is taken into the M-position.

In a variant of this embodiment, the shifting channel only has the conventional positions P (=Parking), R (=Reverse), N (=Neutral) and D. In the D-position of the selector lever, the automatic gear selection is suppressed by a switch which is constructed as a push button and is arranged on the selector lever, and by means of the rocker switch, a shifting command can be triggered for an upshift or downshift.

In a second embodiment of the invention, the manual gear selecting device is constructed as a steering column switch and is arranged on the steering column holding the steering wheel of the motor vehicle. In this embodiment, the shifting channel of the selector lever has either the positions P, R, N, D, M or the positions P, R, N, D. In one embodiment, manual shifting commands are possible only in the M-position of the selector lever by means of the swivelling of the steering column switch.

Another embodiment of the present invention permits the triggering of manual shifting commands in the D-position of the selector lever after an axial displacement of the steering column switch, while the automatic gear selection remains suppressed. This suppressing is canceled by a second axial displacement of the steering column switch, and a manual gear selection is not possible.

A second variant of this embodiment gives shifting commands of the steering column switch in the D-position of the selector lever priority over the automatic gear selection so that a first-time axial displacements of the switch is not necessary. A one-time axial displacement of the switch after the triggering of manual displacement commands again permits the automatic gear selection.

An advantage of this second embodiment is the transferring of the manual gear selecting device into the proximity of the steering wheel and thus into the direct reach of the driver. This increases the driving safety because both hands may remain on the steering wheel and a possibly required eye contact with the selector lever is superfluous.

According to a third embodiment of the invention, the shifting channel of the selector lever is placed on the steering column, and the manual gear selecting device is integrated in the selector lever. In this case, the shifting channel has the positions P, R, N, D, M or the positions P, R, N, D. In the M-position, manual shifting commands are triggered by movement of the selector lever transversely to the shifting channel.

The variant of this embodiment requires no M-position, but permits a manual gear selection in the D-position after a first-time axial displacement of the selector lever. The return to the automatic gear selection is triggered by a second axial displacement.

A second variant of this embodiment gives priority to manual commands by displacement of the selector lever in the D-position so that the automatic gear selection is suppressed. A return to the automatic gear selection is possible by means of a one-time axial displacement of the selector lever.

All embodiments of the invention have a simplified operation in common. The shift gate with only one shifting channel which is known in conventional automatic transmissions was kept so that the swivelling of the selector lever into a second shifting channel is not required.

Other objects, advantages and novel features of the present invention will become apparent from the following detailed description of the invention when considered in conjunction with the accompanying drawings.

BRIEF DESCRIPTION OF THE DRAWINGS

FIG. 1 is a schematic view of a shifting arrangement constructed in accordance with a first embodiment of the present invention.

FIG. 2a is a view of a variant of the first embodiment in the direction of the arrow A according to FIG. 1.

FIG. 2b is a view of a second variant of the first embodiment in the direction of the arrow A according to FIG. 1.

DETAILED DESCRIPTION OF THE DRAWINGS

Figure 3:
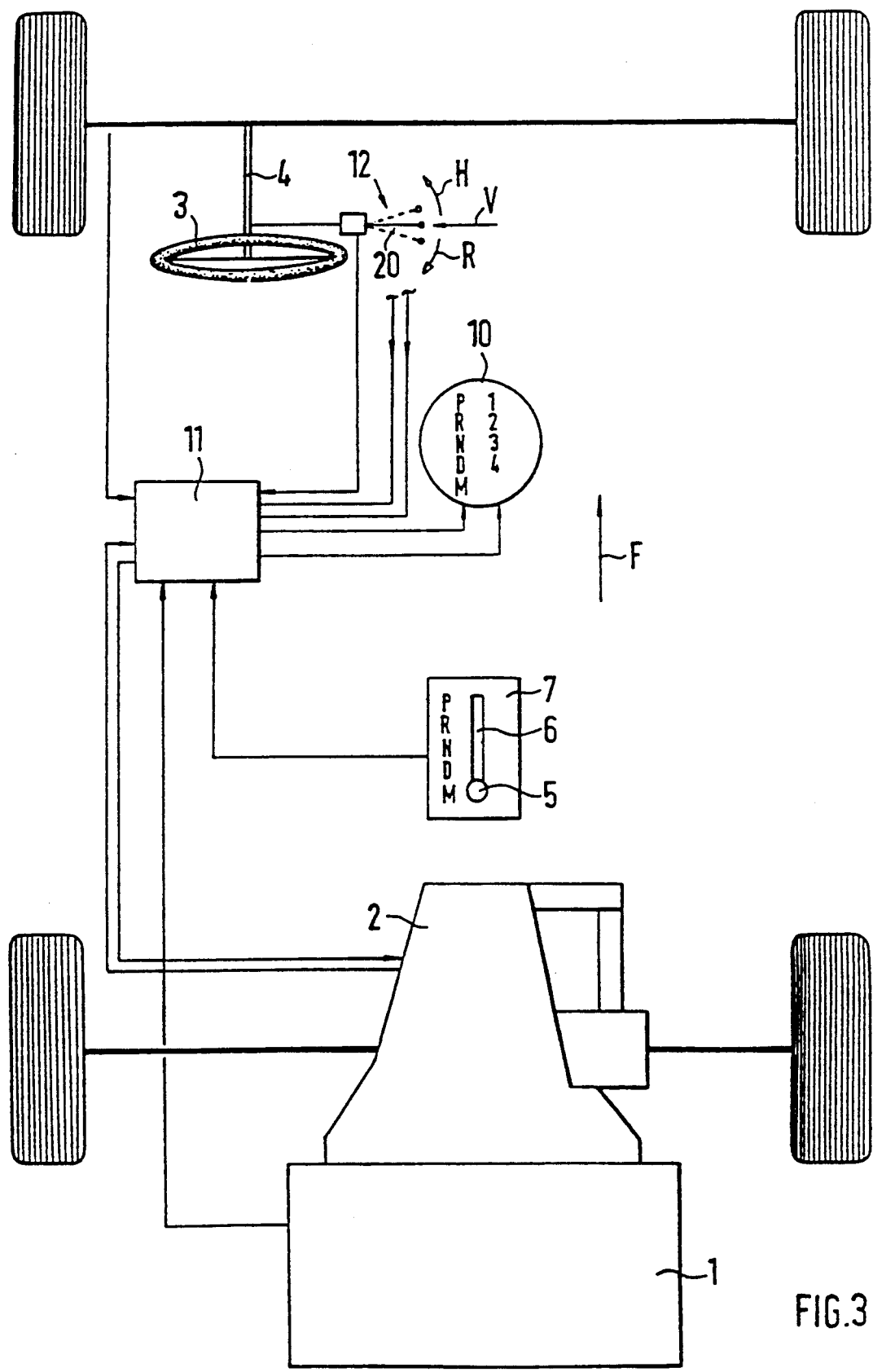
FIG. 3 is a schematic view of a shifting arrangement constructed in accordance with a second embodiment of the present invention.

A motor Vehicle, which is not shown in detail and has the driving direction F, is shown in FIG. 1 as having an internal-combustion engine 1 with an automatic transmission 2 that is flanged to it. A steering wheel 3 is held on a steering column 4. A selector lever 5 for the transmission 2 is guided in a shifting channel 6 of a shift gate 7.

A gear display 10, for example, in a dashboard, signified the P-position (=Parking), the R-position (=Reverse), the N-position (=Neutral), the D-position (=Drive), the M-position (=Manual) of the selector lever 5 and the present forward gear G1, G2, G3, G4 which is selected automatically or manually in Positions D, M.

An electronic control unit 11 controls the transmission 2. Among other things, it processes as input signals the position of the selector lever 5 as well as other signals. These other signals are from, for example, the transmission 2, the internal-combustion engine 1 as well as from components which are not shown, such as the kick-down switch, the stop light switch and wheel rotational speed sensors.

Via a manual gear selecting device 12 (FIGS. 2A, 2B), shifting commands can be triggered which are processed by the control unit 11 and which shift the forward gears G1 to G4. The presently selected forward gear is also signified in the gear display 10.

In the first embodiment of the present invention according to FIG. 1, the manual gear selecting device 12 is constructed as a rocker switch 13 arranged on the selector lever 5. In the M-position of the selector lever 5, by means of this switch 13, upshifts by one gear are performed by actuation in the direction H, and downshifts by one gear are performed by an actuation in the direction R. These shifts each take place from the forward gear which, during the movement of the selector lever 5, was taken from the D-position into the M-position.

Erroneous shifting, such as an upshift from gear G4, is suppressed by the control unit 11. The rocker switch 13 may be arranged, for example, within easy reach, on the front side 14 of the selector lever 5 situated in the driving direction F or on its upper side 15. After each actuating, this switch 13 returns to a neutral center position (FIG. 2A).

In a variant of this embodiment (shown in FIG. 2B), the shifting channel 6 only has the positions P, R, N, D. In the D-position of the selector lever 5, a manual gear selection is possible by means of the rocker switch 13 after the actuating of a switch which is constructed as a push button 16 and is arranged on the top side 15. The automatic gear selection remains suppressed until the push button 16 is actuated again.

A second embodiment of the present invention according to FIG. 3 has a steering column switch 20 as a manual gear selecting device 12 which is arranged on the steering column 4 and the shifting commands of which are processed by the control unit 11. In the M-position of the selector lever 5, manual upshifts or downshifts are performed by actuating the steering column switch 20 in the H- or R-direction. In this case, this switch 20 can be moved upward or downward from a neutral spring-engaged center position, in the manner of a turn signal lever, or forward or backward in the manner of a headlight flasher lever. Movement of the selector lever 5 into the D-position causes the return to the automatic gear selection.

In a variant of this embodiment, the shifting channel 6 only has the positions P, R, N, D. In the D-position of the selector lever 5, the automatic gear selection is suppressed by a first-time axial displacement of the steering column switch 20 in the direction of the arrow V. The switch 20 will then return to its original position. Now manual shifting commands are possible by moving the switch 20 until, by another axial displacement in the direction V, the manual gear selection is suppressed. A second variant of this embodiment provides an immediate manual gear selection by means of the switch 20 in the D-position of the selector lever 5. Shift commands of the switch 20 therefore have a priority determined in the control unit 11. A return to the automatic gear selection is performed by means of a one-time displacement of the switch 20 in the V-direction.

Figure 4:
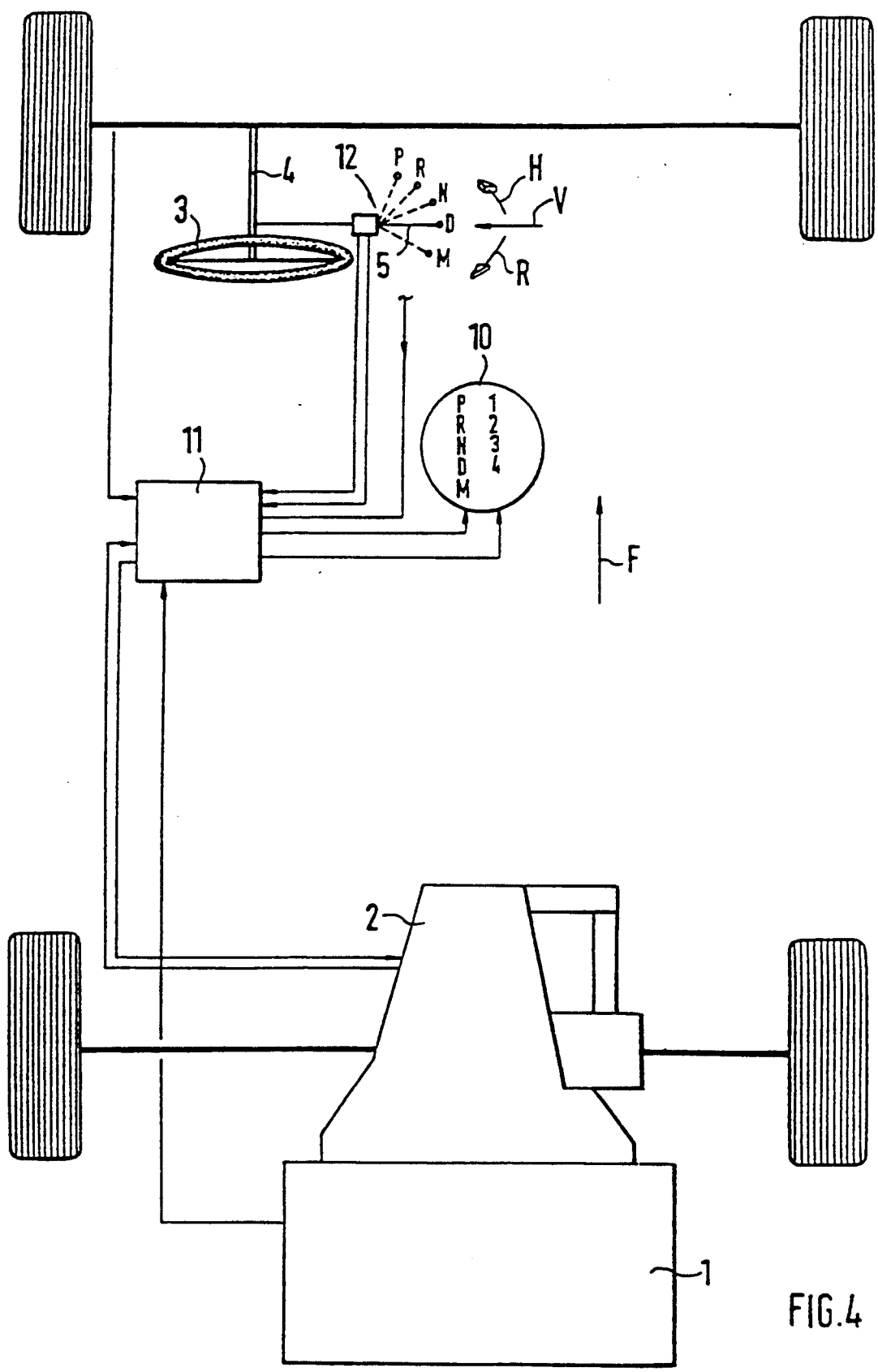
FIG. 4 is a schematic view of a shifting arrangement constructed in accordance with a third embodiment of the present invention.

In a third embodiment of the invention according to FIG. 4, the shift gate 7 with the shifting channel 6 is placed on the steering column 4. The gear selecting device 12 is integrated into the bearing of the selector lever 5 in such a manner that the control unit 11, as a function of the moving direction of the selector lever 5, receives manual shift commands or processes the position of the selector lever 5. By movement of the selector lever 5 in the manner of a turn signal lever, positions P, R, N, D, M are selected. By movement of the gear selecting device 12 in the H- or R-direction when the selector lever 5 is in the M-position, perpendicularly to the shifting channel 6, upshift and downshift commands are triggered.

In a variant of this third embodiment, the shifting channel 6 has positions P, R, N, D, and the manual gear selection can be switched on and off analogously to the second variant of the second embodiment by the axial shifting in the V-direction.

A second variant of this third embodiment permits an immediate manual gear selection by means of the selector lever 5 in the D-position by a priority determined in the control unit 11. A return to the automatic gear selection is possible by the one-time displacement of the selector lever 5 in the V-direction.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A shifting arrangement for an automatic transmission of a motor vehicle controlled by an electronic control unit, comprising:
   a shifting channel;
   a selector lever in said shifting channel that is movable in the shifting channel to select different transmission gears, said selector lever being movable in said shifting channel into a predetermined position in which a manual gear selecting device can trigger shifting commands; and
   a manual gear selecting device coupled to the electronic control unit which triggers shifting commands for shifting forward gears of the transmission, said manual gear selecting device being activated by movement of said selector lever into said predetermined position in said shifting channel;
   wherein the manual gear selecting device is a rocker switch arranged on the selector lever; and
   wherein the shifting channel has the positions (P, R, N, D), and a second switch is arranged on the selector lever, wherein the transmission is shiftable by the rocker switch only in the D-position of the selector lever after the actuating of the second switch.

2. A shifting arrangement for an automatic transmission of a motor vehicle controlled by an electronic control unit, comprising:
   a shifting channel;
   a selector lever in said shifting channel that is movable in the shifting channel to select different transmission gears, said selector lever being movable in said shifting channel into a predetermined position in which a manual gear selecting device can trigger shifting commands; and
   a manual gear selecting device coupled to the electronic control unit which triggers shifting commands for shifting forward gears of the transmission, said manual gear selecting device being activated by movement of said selector lever into said predetermined position in said shifting channel;
   wherein the motor vehicle has a steering column arranged in the motor vehicle and a steering wheel held on the steering column, and the gear selecting device is a steering column switch arranged on the steering column.

3. An arrangement according to claim 2, wherein the shifting channel has the positions (P, R, N, D, M), and the steering column switch is able to trigger a shifting command only in the M-position of the selector lever.

4. An arrangement according to claim 3, wherein the steering column switch, starting from a neutral center position, by means of a single clockwise or counterclockwise movement, triggers a downshift or upshift by one forward gear.

5. An arrangement according to claim 3, wherein the steering column switch, starting from a neutral position, by means of a single movement in the driving direction of the vehicle or against the driving direction of the vehicle, triggers an upshift or a downshift by one forward gear.

6. An arrangement according to claim 2, wherein the shifting channel has the positions (P, R, N, D), and by means of the steering column switch the shifting operations on the transmission can be triggered only in the D-position of the selector lever.

7. An arrangement according to claim 6, wherein the steering column switch triggers shifting commands by a one-time displacement in its axial direction, followed by subsequent rotational movement of the steering column switch.

8. An arrangement according to claim 7, wherein a second displacement of the steering column switch in its axial direction which follows the first-time displacement, causes the control unit to suppress shifting commands triggered by the steering column switch.

9. An arrangement according to claim 6, wherein the control unit includes means for suppressing shifting commands, after the rotational movement of the steering column switch has taken place, by a one-time displacement of the steering column switch in its axial direction.

10. A shifting arrangement for an automatic transmission, of a motor vehicle controlled by an electronic control unit, comprising:
    a shifting channel;
    a selector lever in said shifting channel that is movable in the shifting channel to select different transmission gears, said selector lever being movable in said shifting channel into a predetermined position in which a manual gear selecting device can trigger shifting commands; and
    a manual gear selecting device coupled to the electronic control unit which triggers shifting commands for shifting forward gears of the transmission, said manual gear selecting device being activated by movement of said selector lever into said predetermined position in said shifting channel;
    wherein said motor vehicle has a steering column arranged therein and a steering wheel held on the steering column, and wherein the shifting channel is arranged on the steering column, and the manual gear selecting device is integrated in the selector lever.

11. An arrangement according to claim 10, wherein the shifting channel has the positions (P, R, N, D, M), and the forward gears can be shifted by rotational movement of the selector lever to the shifting channel, while said selector lever is in the M-position.

12. An arrangement according to claim 10, wherein the shifting channel has the positions (P, R, N, D), and the forward gears can be shifted after a first-time displacement of the selector lever in its axial direction while in the D-position, followed by rotational movement of the selector lever transversely to the shifting channel.

13. An arrangement according to claim 12, wherein the control unit includes means for suppressing shifting commands triggered by the selector lever, after a second axial displacement of the selector lever in the D-position which follows the first-time displacement.

14. An arrangement according to claim 10, further comprising means for suppressing shifting commands for forward gears by a one-time axial displacement of the selector lever after the rotational movement of the selector lever transversely to the shifting channel, the shifting channel having the positions (P, R, N, D).

* * * * *